United States Patent
Zhang et al.

(10) Patent No.: US 12,101,280 B2
(45) Date of Patent: Sep. 24, 2024

(54) PROVIDING RESPONSES IN AN EVENT-RELATED SESSION

(71) Applicant: Microsoft Technology Licensing, LLC, Redmond, WA (US)

(72) Inventors: Jie Zhang, Dongcheng District (CN); Jianyong Wang, Redmond, WA (US); Peng Chen, Redmond, WA (US); Zeyu Shang, Redmond, WA (US); Ye Yu, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 260 days.

(21) Appl. No.: 17/606,857

(22) PCT Filed: Apr. 2, 2020

(86) PCT No.: PCT/US2020/026462
§ 371 (c)(1),
(2) Date: Oct. 27, 2021

(87) PCT Pub. No.: WO2020/242596
PCT Pub. Date: Dec. 3, 2020

(65) Prior Publication Data
US 2022/0210098 A1      Jun. 30, 2022

(30) Foreign Application Priority Data
May 31, 2019   (CN) .......................... 201910468365.X

(51) Int. Cl.
*H04L 51/02*    (2022.01)
*G06F 16/31*    (2019.01)
(Continued)

(52) U.S. Cl.
CPC ............ *H04L 51/02* (2013.01); *G06F 16/313* (2019.01); *G06F 16/3326* (2019.01); *G06F 16/3329* (2019.01); *G06F 16/335* (2019.01)

(58) Field of Classification Search
CPC ... H04L 51/02; G06F 16/313; G06F 16/3326; G06F 16/3329; G06F 16/335; G06F 16/31; G06N 3/008
See application file for complete search history.

(56) References Cited

U.S. PATENT DOCUMENTS 9,965,553 B2 *  5/2018  Lyren ................... G06F 16/9538
10,418,032 B1 * 9/2019  Mohajer ............. G10L 15/1815
(Continued)

FOREIGN PATENT DOCUMENTS

CN    102866990 A    1/2013
CN    105915436 A    8/2016
(Continued)

OTHER PUBLICATIONS

Rakshit et al., Debbie, the Debate Bot of the Future, 2018, Part of the Lecture Notes in Electrical Engineering book series (LNEE,vol. 510) (Year: 2018).*

(Continued)

*Primary Examiner* — Hitesh Patel
*Assistant Examiner* — Vinh Nguyen
(74) *Attorney, Agent, or Firm* — Schwegman Lundberg & Woessner, P.A.

(57) ABSTRACT

The present disclosure provides a method and an apparatus for providing responses in an event-related session. The event is associated with a predefined domain, and the session comprises an electronic conversational agent and at least one participant. At least one message from the at least one participant may be detected. A set of candidate responses may be retrieved, from an index set being based on the
(Continued)

domain, according to the at least one message. The set of candidate responses may be optimized through filtering the set of candidate responses according to predetermined criteria. A response to the at least one message may be selected from the filtered set of candidate responses. The selected response may be provided in the session.

14 Claims, 7 Drawing Sheets

(51) Int. Cl.
*G06F 16/332* (2019.01)
*G06F 16/335* (2019.01)

(56) References Cited

U.S. PATENT DOCUMENTS

| | | | |
|---|---|---|---|
| 10,629,191 B1* | 4/2020 | Cheng | G06F 40/205 |
| 10,795,640 B1* | 10/2020 | Knight | G06F 3/0487 |
| 10,958,599 B1* | 3/2021 | Penov | H04W 12/08 |
| 10,978,056 B1* | 4/2021 | Challa | G06N 5/025 |
| 11,144,331 B1* | 10/2021 | Kushner | G06F 8/60 |
| 11,457,863 B1* | 10/2022 | Roy | G16H 40/63 |
| 2003/0220972 A1 | 11/2003 | Montet et al. | |
| 2004/0068406 A1* | 4/2004 | Maekawa | H04N 21/488 704/E15.04 |
| 2006/0155765 A1* | 7/2006 | Takeuchi | G06F 16/3329 |
| 2008/0046394 A1* | 2/2008 | Zhou | G06F 16/35 706/52 |
| 2009/0013052 A1* | 1/2009 | Robarts | G06Q 10/107 709/206 |
| 2011/0125734 A1* | 5/2011 | Duboue | G09B 7/00 707/723 |
| 2013/0283168 A1* | 10/2013 | Brown | G06F 3/165 715/728 |
| 2014/0074454 A1* | 3/2014 | Brown | G10L 15/08 704/235 |
| 2015/0100581 A1* | 4/2015 | O'Donnell | H04L 67/10 707/737 |
| 2016/0042275 A1* | 2/2016 | Dettman | G06F 8/37 706/46 |
| 2016/0085398 A1* | 3/2016 | Cifteli | G06F 3/04847 715/740 |
| 2016/0132590 A1 | 5/2016 | Byron et al. | |
| 2016/0217209 A1* | 7/2016 | Beamon | G06F 16/24578 |
| 2017/0230312 A1* | 8/2017 | Barrett | H04L 51/02 |
| 2017/0308531 A1* | 10/2017 | Ma | G06F 16/2471 |
| 2017/0329764 A1 | 11/2017 | Beller et al. | |
| 2018/0089163 A1* | 3/2018 | Ben Ami | H04L 51/02 |
| 2018/0150524 A1 | 5/2018 | Anger et al. | |
| 2018/0227250 A1* | 8/2018 | Zappacosta | G06Q 10/063112 |
| 2018/0248818 A1* | 8/2018 | Zucker | G06Q 30/01 |
| 2018/0293484 A1* | 10/2018 | Wang | G06F 16/632 |
| 2018/0293983 A1* | 10/2018 | Choi | G10L 15/1815 |
| 2019/0007228 A1* | 1/2019 | Vuskovic | G06F 16/00 |
| 2019/0027142 A1* | 1/2019 | Iwanami | G06F 16/337 |
| 2019/0179895 A1* | 6/2019 | Bhatt | G06Q 50/01 |
| 2019/0205381 A1* | 7/2019 | Raux | H04L 51/02 |
| 2020/0065873 A1* | 2/2020 | Ruvini | G06F 16/338 |
| 2020/0162911 A1* | 5/2020 | Dhanuka | H04W 12/55 |
| 2020/0251111 A1* | 8/2020 | Temkin | G06F 16/2423 |
| 2020/0402502 A1* | 12/2020 | Hanes | G06F 3/167 |
| 2021/0105236 A1* | 4/2021 | Abdelmalek | H04L 67/02 |
| 2021/0126985 A1* | 4/2021 | Brush | H04L 67/60 |
| 2021/0232632 A1* | 7/2021 | Howard | G06F 16/335 |
| 2021/0280181 A1* | 9/2021 | Saito | G06F 3/013 |
| 2021/0350209 A1* | 11/2021 | Wang | G06F 16/63 |
| 2022/0188372 A1* | 6/2022 | Michalski | H04L 67/131 |
| 2022/0366147 A1* | 11/2022 | Ho | G06F 40/35 |

FOREIGN PATENT DOCUMENTS

| | | |
|---|---|---|
| WO | 2018157329 A1 | 9/2018 |
| WO | 2018165932 A1 | 9/2018 |

OTHER PUBLICATIONS

Maynard et al., Automatic Detection of Political Opinions in Tweets, 2011, https://www.researchgate.net/publication/220854317 (Year: 2011).*

Mohammad et al., Stance and Sentiment in Tweets, published 2016, ACM Transactions on Embedded Computing Systems, vol. 0, No. 0, Article 0. (Year: 2016).*

"International Search Report and Written Opinion Issued in PCT Application No. PCT/US20/026462", Mailed Date: Jul. 16, 2020, 15 Pages.

Rakshit, et al., "Debbie, The Debate Bot of the Future", In Repository of arXiv: 1709.03167v1, Sep. 10, 2017, 6 Pages.

"Pro Virtual Robot", Retrieved from: http://operation.tuling123.com/products/pro_virtual_robot.jhtml?nav=prod, Retrieved Date: May 31, 2022, 2 Pages.

"Knowledge Base Upgrade", Retrieved from: https://web.archive.org/web/20170320160325/http://www.tuling123.com/activity/upgradeKnowledge.jhtml, Mar. 20, 2017, 3 Pages.

"When you Talk to Tmall Genie, What is it Thinking? In-Depth Interpretation of Alibaba's Intelligent Dialogue Technology", Retrieved from: https://www.jianshu.com/p/b6a81c5e36b5, Mar. 29, 2018, 13 Pages.

Office Action Received for Chinese Application No. 201910468365.X, mailed on Feb. 28, 2024, 08 pages (English Translation Provided).

* cited by examiner

PROVIDING RESPONSES IN AN EVENT-RELATED SESSION

CROSS REFERENCE TO RELATED APPLICATION

This Application is a U.S. National Stage Filing Under 35 U.S.C. 371 of International Patent Application Serial No. PCT/US2020/026462, filed Apr. 2, 2020, and published as WO 2020/242596 A1 on Dec. 3, 2020, which claims priority to Chinese Application No. 201910468365 X, filed May 31, 2019, which applications and publication are incorporated herein by reference in their entirety.

BACKGROUND

Artificial intelligence (AI) chatbots are becoming more and more popular and are being applied in more and more scenarios. Chatbots are designed to simulate human conversations and may chat with users through text, voice, images, etc. Generally, chatbots may be built with machine learning-based chatting models. When receiving a message input by a user, a chatting model may identify keywords in the message or apply natural language processing to the message, and output a response to the message.

SUMMARY

This Summary is provided to introduce a selection of concepts that are further described below in the Detailed Description. It is not intended to identify key features or essential features of the claimed subject matter, nor is it intended to be used to limit the scope of the claimed subject matter.

Embodiments of the disclosure propose a method and an apparatus for providing responses in an event-related session. The event is associated with a predefined domain, and the session comprises an electronic conversational agent and at least one participant. At least one message from the at least one participant may be detected. A set of candidate responses may be retrieved, from an index set being based on the domain, according to the at least one message. The set of candidate responses may be optimized through filtering the set of candidate responses according to predetermined criteria. A response to the at least one message may be selected from the filtered set of candidate responses. The selected response may be provided in the session.

It should be noted that the above one or more aspects comprise the features hereinafter fully described and particularly pointed out in the claims. The following description and the drawings set forth in detail certain illustrative features of the one or more aspects. These features are only indicative of the various ways in which the principles of various aspects may be employed, and this disclosure is intended to include all such aspects and their equivalents.

BRIEF DESCRIPTION OF THE DRAWINGS

The disclosed aspects will hereinafter be described in connection with the appended drawings that are provided to illustrate and not to limit the disclosed aspects.

DETAILED DESCRIPTION

Figure 1:
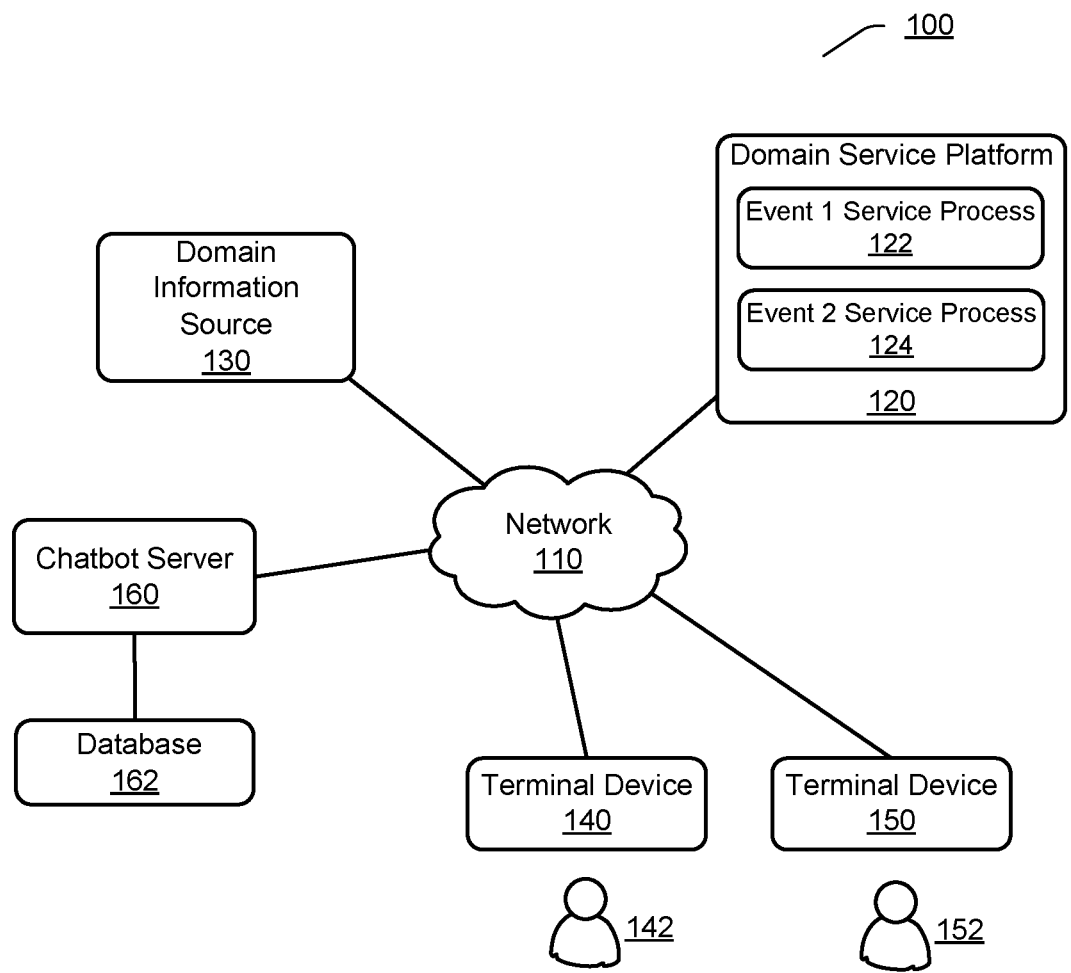
FIG. 1 illustrates an exemplary application scenario of implementing an event-related session according to an embodiment.

The present disclosure will now be discussed with reference to several example implementations. It is to be understood that these implementations are discussed only for enabling those skilled in the art to better understand and thus implement the embodiments of the present disclosure, rather than suggesting any limitations on the scope of the present disclosure.

Generally, a chatting model adopted by a chatbot is trained based on a large amount of data from human conversations. A trained chatting model may simulate human conversations and chat with users in real time. A chatbot constructed based on training data in a general domain may conduct pure chat with users, wherein the pure chat may also be referred to as free chat, chitchat, etc. In an application scenario, a chatbot may conduct a pure chat with more than one user in a group chat or chat room.

Embodiments of the present disclosure propose to provide, in an event-related session, a response to one or more other participants in the session by an electronic conversational agent, e.g., a response associated with the event, a response associated with a domain to which the event belongs, etc. The electronic conversational agent may be, e.g., a chatbot. Herein, a "session" may refer to a time continuous conversation between a chatbot and one or more chat participants, which may be a multi-party chat in a group chat or a chat in a chat room, or may be a one-to-one chat between a chatbot and another chat participant. A session may comprise messages and responses in a conversation, wherein a "message" refers to any information input by a participant other than the chatbot, e.g., a query from a user, an answer of the user to a question of the chatbot, an opinion of the user, etc., and a "response" refers to any information provided by the chatbot, e.g., an answer of the chatbot to a question of the user, a comment of the chatbot, etc. The term "message" and the term "query" may also be used interchangeably. Herein, an "event" may refer to an activity with a time attribute, the state of which changes over time. For example, events may include sports games, electronic game live, art performances, etc. Taking a "football game" event as an example, a football game has its time attribute, which may at least comprise, e.g., start time of the game, end time of the game, a time period between the start time of the game and the end time of the game, a time period before the game starts, a time period after the game ends, etc. States of a football game will change over time, for example, scores, fouls, player performance, live audiences' behaviors, etc. will change over time. Events may occur in real time, e.g., an ongoing football game, or may not occur in real time, e.g., a talent contest that has ended. Generally, an event may be associated with one or more specific domains, for example, a football game may be associated with the football domain or sports domain, an electronic game may be associated with the e-sports domain or game domain, a talent contest may be associated with the art performance domain, etc. An "event-related session" may refer to a session with an event as the core or main topic, e.g., chat in a chat room related to a football game, group chat related to an electronic game live, etc.

Embodiments of the present disclosure may enable a chatbot, in addition to being capable of conducting pure chat, to have an ability to provide responses associated with specific events or specific domains in a session. Thus, when a chatbot participates in a session related to a certain event, the chatbot may provide various responses that are more relevant to the event at which the session directs. For example, the chatbot may discuss the event with other participants, may provide professional comments on the event, may provide reports on the progress of the event in real-time, etc. The embodiments of the present disclosure may enhance relevance of responses of a chatbot in a session, increase participation of the chatbot in the session, guide discussions of other participants through the responses of the chatbot, improve the overall activeness of the session, etc.

In an aspect, a chatbot may conduct a domain-based chat with other participants in an event-related session. For example, for a message from a participant, the chatbot may provide a response generated according to the domain with which the event is associated. Thus, the chatbot may discuss the event with other participants, e.g., discussing entities involved in the event, discussing facts occurring in the event, etc. Taking an event related to a football game as an example, this football game event is associated with the football domain or sports domain, entities involved in the event may comprise teams, players, coaches, etc. participating in the football game, and facts occurring in the event may comprise situations occurring during the football game, e.g., a team scores, a player fouls, etc. The chatbot may generate responses according to corpus from a domain associated with the event, to conduct a chat which is based on the domain. Through the domain-based chat mechanism, interactions between the chatbot and other participants may be improved, in-depth topic discussions may be guided, etc.

In an aspect, a domain-based chat of a chatbot with other participants in an event-related session may comprise providing professional comments on the event. Corpus related to the event, e.g., comments, articles, etc., may be collected in advance in the domain associated with the event, and content may be extracted from the corpus to be provided to other participants as responses in the session. Since the corpus may be professional comments, articles, etc. regarding the event created by professionals, the responses generated based on the corpus may enable the chatbot to perform with higher professionalism. Taking an event related to a football game as an example, professionals may publish forward-looking articles about the football game before the game, which may comprise, e.g., analysis to teams and/or players, prediction of game result, etc., and a chatbot may provide content of these forward-looking articles in the session as responses.

In an aspect, the chatbot may provide real-time event content in an event-related session, e.g., providing a report about the progress of the event in real time, etc. Taking an event related to a football game as an example, a chatbot may detect real-time information occurring during the football game, e.g., a goal, etc., and accordingly provide a report about the goal in the session. Through providing real-time event content, it may enhance other participants' interest, trust, etc. to the chatbot.

In an aspect, the chatbot may maintain a consistency of stances in an event-related session, for example, stances of a plurality of responses provided by the chatbot are consistent. Herein, "stance" may refer to preference, support level, etc. to entities involved in the event. Taking an event related to a football game as an example, entities may comprise teams, players, coaches, etc., and stances may comprise supporting one of two teams, liking a player, etc. Maintaining a consistency of stances may prevent responses provided by the chatbot to an entity from being not contradictory.

In an aspect, the chatbot may maintain a consistency of opinions in an event-related session, for example, opinions of a plurality of responses provided by the chatbot are consistent. Herein, an "opinion" may refer to view, comment, etc. to facts occurring in the event. Taking an event related to a football game as an example, facts may comprise that a team scores, a player fouls, etc., and opinions may comprise thinking that a goal is invalid, thinking that a foul is too malicious, etc. Maintaining a consistency of opinions may prevent responses provided by the chatbot to facts from being not contradictory.

In an aspect, a chatbot may detect other participants' common opinion or comment trend on a certain fact in an event-related session, and follow the same or similar opinion in subsequent responses too. Taking an event related to a football game as an example, if a plurality of other participants think that a red card should be shown for a player's foul, the chatbot may give a response that agrees with the opinion of "showing a red card". Following a common opinion may enable the chatbot to be more gregarious, obtain resonance with other participants, etc.

In an aspect, the chatbot may ensure freshness of responses provided in an event-related session. The chatbot may obtain the latest background information about entities in the event, and make the provided responses conform to the latest background information instead of outdated background information. Taking an event related to a football game as an example, if it is known in advance that player M in a team participating in the football game has been transferred to another team before the game, comments to player M' performance in the football game may be avoided from occurring in responses of the chatbot.

In an aspect, the embodiments of the present disclosure are not limited to deploying only one chatbot in an event-related session, but may deploy two or more chatbots in the same session. In this case, all of the two or more chatbots may chat with other participants, and a predetermined pattern of chat may also be performed among the two or more chatbots. Through deploying two or more chatbots in a session, it may improve the overall activeness of the session, etc.

It should be appreciated that, although a football game event in the football domain or sports domain is taken as an example in several parts of the above and following discussions, the embodiments of the present disclosure are not limited to such a domain and event, but may be applied to any other domains and events in a similar manner.

FIG. 1 illustrates an exemplary application scenario 100 of implementing an event-related session according to an embodiment.

In FIG. 1, a network 110 is applied to interconnect among various network entities. The network 110 may be various types of network capable of interconnecting network entities. The network 110 may be a single network or a combination of various types of network.

A domain service platform 120 may be connected to the network 110. The domain service platform 120 may refer to a platform, server, website, etc. that provides users with various services in a specific domain on the network 110, e.g., a website that provides game broadcast in the sports domain, a server that provides on-line game live in the game domain, a platform that provides talent contest broadcast in the art performance domain, etc. The domain service platform 120 may establish corresponding service processes for different events in the domain, e.g., a service process 122 for event 1, a service process 124 for event 2, etc. These event service processes may have corresponding user interfaces to provide text or image broadcast of events, run chat rooms related to events, etc. Taking the domain service platform 120 being a game broadcast website in the sports domain as an example, a service process may be established for a football game event between a team A and a team B, so that users may view the progress of the game, chat about the game, etc. in the user interface of the service process. Although only one domain service platform is shown in FIG. 1, it should be appreciated that there may be a different number of domain service platforms connected to the network 110.

A domain information source 130 may also be connected to the network 110. The domain information source 130 may be a platform, server, website, etc. capable of providing various types of related information in a specific domain. The information provided by the domain information source 130 may comprise introductions, comments, reports, etc. on various events, entities, etc. in the domain. Taking the domain information source 130 being a portal in the football domain as an example, the domain information source 130 may provide various types of information related to football games, e.g., introductions of teams and players, status updates of teams and players, player and coach transfer information, predictions and comments on football games, etc. It should be appreciated that although the domain information source 130 is shown as separate from the domain service platform 120 in FIG. 1, the domain information source 130 may also be contained in the domain service platform 120.

A terminal device 140 and a terminal device 150 are exemplarily shown connected to the network 110 in FIG. 1, which may be any types of electronic computing device capable of accessing servers or websites on the network 110, processing data or signals, etc. For example, the terminal devices 140 and 150 may be desktop computers, notebook computers, tablet computers, smart phones, AI terminals, etc. Although only two terminal devices are shown in FIG. 1, it should be appreciated that a different number of terminal devices may be connected to the network 110. A user 142 and a user 152 may access the domain service platform 120 via the terminal device 140 and the terminal device 150 respectively, in order to participate in the event service process in the domain service platform 120. For example, the user 142 and the user 152 may participate in a session in a chat room related to event 1 through a user interface of the service process 122 for event 1.

A chatbot server 160 for providing a chatbot service is exemplarily shown in FIG. 1. The chatbot server 160 may access the domain service platform 120 via the network 110 in order to participate in the event service processes in the domain service platform 120. For example, a chatbot provided by the chatbot server 160 may participate in a session in a chat room related to event 1 through a user interface of the service process 122 for event 1, e.g., chatting with the user 142 and the user 152, etc.

The chatbot server 160 may be connected to or contain a database 162. The database 162 may comprise various types of information that may be used by the chatbot server 160 to generate responses. The database 162 may comprise an index set established according to corpus in a particular domain, which may be used by the chatbot for a domain-based chat. The database 162 may comprise an index set established according to corpus related to a specific event in a specific domain, which may be used by the chatbot to provide professional comments to the event, wherein the professional comments may be used as a part of a domain-based chat conducted by the chatbot. The database 162 may comprise background information related to entities involved in a particular event, which may be used for providing responses with freshness. The database 162 may comprise a knowledge graph established for a specific domain, which may be used for identifying entities in messages from users, extending messages, etc. For example, different levels of text segments, e.g., entities, phrases, topics, etc., may be extracted from a large amount of corpus in the specific domain, and these text segments are associated together based on co-occurrence of words so as to form a knowledge graph. The knowledge graph will facilitate to improve relevance between responses provided by the chatbot and messages from users. Moreover, the database 162 may further comprise various other types of information that may be used for generating responses.

It should be appreciated that all of the network entities shown in FIG. 1 are exemplary, and depending on specific application requirements, any other network entities may be involved in the application scenario 100.

Figure 2:
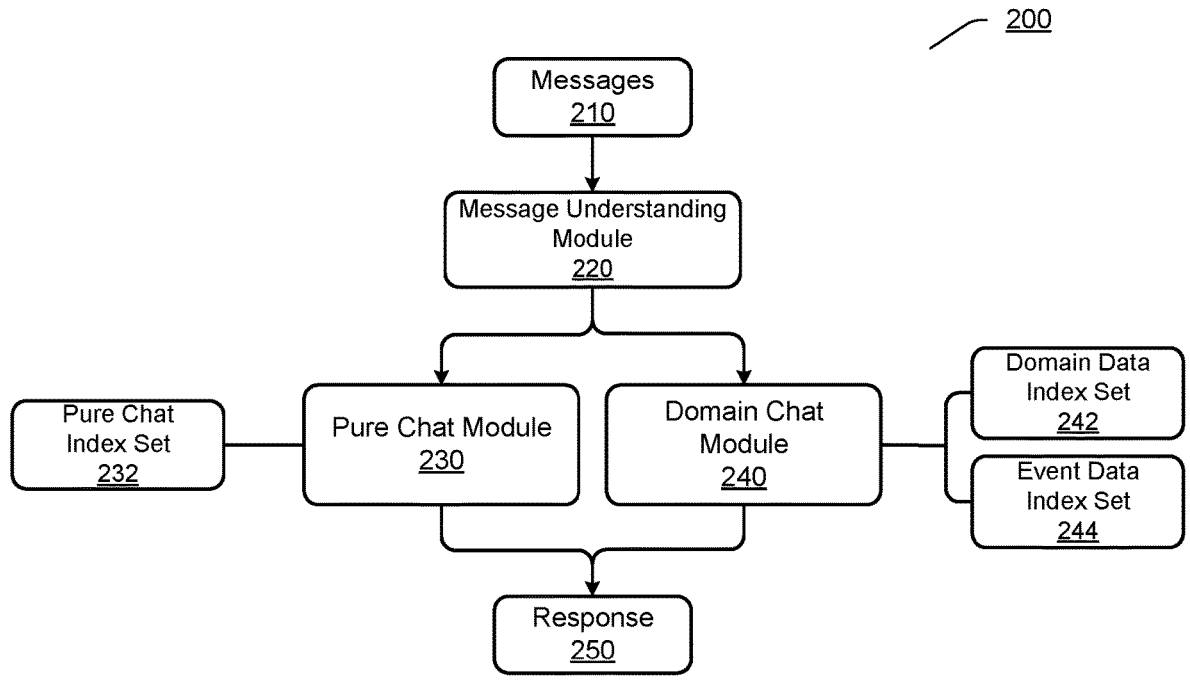
FIG. 2 illustrates an exemplary architecture for providing responses in an event-related session by a chatbot according to an embodiment.

FIG. 2 illustrates an exemplary architecture 200 for providing responses in an event-related session by a chatbot according to an embodiment. For example, the architecture 200 may be a retrieval-based response providing architecture.

The chatbot may continuously detect messages 210 from at least one another participant in the session. In an implementation, the chatbot does not need to respond to all the messages 210, but may selectively respond to a part of the messages.

The chatbot may comprise a message understanding module 220. The message understanding module 220 may be used for performing semantic completion on a context-dependent message in the messages 220. For example, if a message is "he fell down," the pronoun "he" in the message will cause the message to be context-dependent, i.e., the person to whom "he" refers specifically needs to be determined from the context. If it is determined from the previous messages that "he" refers to "player M", the message understanding module 220 may semantically complete the message as "player M fell down" for facilitating the subsequent processes. Moreover, the message understanding module 220 may be used for filtering out, according to predetermined policy, messages that are not desired to respond from the messages 210, e.g., messages containing advertisement, messages containing risky expression, pure chat messages unrelated to the chatbot, etc.

The chatbot may comprise a pure chat module 230 for responding to pure chat messages that are unrelated to the event but related to the chatbot. The pure chat module 230 may adopt a response generating architecture trained in a general domain. A pure chat index set 232 may be established with data from, e.g., social networks, and index entries in the pure chat index set 232 may take the form of query-response (QR) pair, response-only, etc. When a message is input, the pure chat module 230 may generate a response to the message by matching with index entries in the pure chat index set 232. For example, assuming that a participant sends a message "Are you a man or a woman?" to a chatbot, and this message is determined as a pure chat message related to the chatbot, the chatbot may utilize the pure chat module 230 to generate a response "I'm a pretty girl".

The chatbot may comprise a domain chat module 240 for responding to messages related to the event. The domain chat module 240 may adopt a response generating architecture trained in a specific domain according to the present disclosure. In an implementation, a domain data index set 242 may be established based on corpus in the domain associated with the event. The domain data index set 242 comprises index entries extracted from various types of corpus in the domain, and the corpus comprises, e.g., introductions, comments, reports, etc. for entities and facts of various events in the domain, and introductions, comments, reports, etc. especial for entities involved in the event of this session. When a message is input, the domain chat module 240 may generate a response which directs to the message and is based on the corpus in the domain, through matching the message with index entries in the domain data index set 242. For example, assuming that a participant sends a message "player M is awesome", and this message is determined as an event-related message, especially a message related to the entity "player M" involved in the event, the domain chat module 240 may utilize the domain data index set 242 to generate a response "player M is the core character in team A" which may be based on an introductory corpus of player M and the team A in the football domain in the domain data index set 242. In an implementation, an event data index set 244 may be established according to corpus related to the event of the session. The event data index set 244 comprises index entries extracted from various types of corpus related to the event, and the corpus may comprise some professional comments or forward-looking articles related to the event. When a message is input, the domain chat module 240 may generate a response including a professional comment on the event based on the message and the index entries in event data index set 244. For example, assuming that a participant sends a message "Team A's offense is much stronger than Team B", and this message is determined as a message related to the event "Football game between Team A and Team B", the domain chat module 240 may utilize the event data index set 244 to generate a response "Team A has a fast offensive speed and players cooperate tacitly, while team B has difficulty in organizing an effective offense. Team A has a high probability of winning the game" which may be based on corpus in a prediction article for the game obtained before the game in the event data index set 244.

In some implementations, for an event-related message, the domain chat module 240 may try to retrieve candidate responses from the domain data index set 242 and the event data index set 244 respectively, and then select the final response. When selecting, candidate responses from different index sets may be given different weights. For example, since the index entries in the event data index set 244 tend to give professional comments, which may be desirable, the candidate responses from the event data index set 244 may be given higher weights.

It should be appreciated that the domain data index set 242 and the event data index set 244 may be constructed according to information from, e.g., the domain information source 130 in FIG. 1, and may be stored in, e.g., the database 162 in FIG. 1.

With the pure chat module 230 or the domain chat module 240 in the chatbot, a response 250 to a message processed by the message understanding module 220 may be generated. The chatbot may further provide the response 250 in the event-related session.

It should be appreciated that the architecture 200 shown in FIG. 2 is exemplary, and depending on specific application requirements, any forms of changes may be made to the architecture 200. For example, the pure chat module 230 may be omitted from the chatbot, so that the chatbot is specifically used for a domain-based chat. For example, although the domain data index set 242 and the event data index set 244 are shown as two separate index sets, these two index sets may also be combined into one index set, so that the domain chat module 240 may retrieve candidate responses from the combined index set and finally determine the response 250 without distinguishing between domain data index entries and event data index entries. For example, in the case that the event is associated with two or more domains, it is also possible to establish corresponding two or more domain data index sets in advance, so that the domain data index set 242 in FIG. 2 actually may also represent any one or more domain data index sets among these domain data index sets, or a single domain data index set formed by combining any one or more of these domain data index sets.

Figure 3:
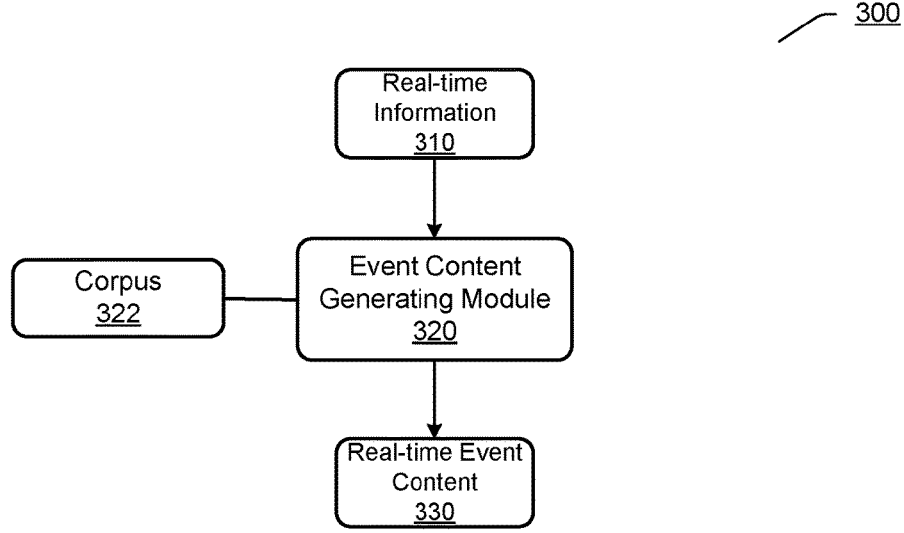
FIG. 3 illustrates an exemplary architecture for providing real-time event content in an event-related session by a chatbot according to an embodiment.

FIG. 3 illustrates an exemplary architecture 300 for providing real-time event content in an event-related session by a chatbot according to an embodiment.

The chatbot may obtain real-time information 310 about the event. The real-time information 310 may comprise various types of information about the latest progress of the event. For example, in a football game event, the real-time information may comprise current goal information, current foul information, etc. The chatbot may obtain the real-time information 310 from different sources. In an implementation, real-time information may be obtained from a message sent by a participant in the session. For example, in a chat room related to a football game, there is usually a host who will broadcast real-time information about the game to other participants in the chat room, for example, when team A scores a goal, the host will immediately send a message "Team A has scored a goal and the score becomes 1:0". This message from the host may be used as real-time information 310 by the chatbot. In another implementation, the chatbot may obtain the real-time information 310 from an event database updated in real time for the event. For example, when a football game is ongoing, the organizer of the game usually releases information on the field in real time, for example, when player M in team A scores a goal, the organizer will immediately release a message "At the $31^{st}$ minute of the first half, player M in team A scored". Such information may be stored in an event database updated in real time, and the chatbot may access the information in the event database as the real-time information 310.

The chatbot may comprise an event content generating module 320, which may be used for generating real-time event content 330 according to the real-time information 310. In an implementation, the event content generating module 320 may generate the real-time event content 330 with various expression templates for different scenarios stored in the corpus 322. The event content generating module 320 may first identify involved entities and associated facts from the real-time information 310, e.g., identifying an entity "team A" and a fact "goal" from the real-time information "Team A has scored a goal and the score becomes 1:0". Then, the event content generating module 320 may retrieve candidate templates involving the fact "goal" from the corpus 322 and select a template to be used therefrom, e.g., "Great!<entity> scored an important goal!", wherein "<entity>" indicates the team that scored the goal. The event content generating module 320 may utilize the entity identified from the real-time information 310 to fill the template, thus obtaining the real-time event content "Great! Team A scored an important goal!".

The chatbot may provide the generated real-time event content 330 in the event-related session, so that other participants may know the latest progress of the event in time.

Figure 4:
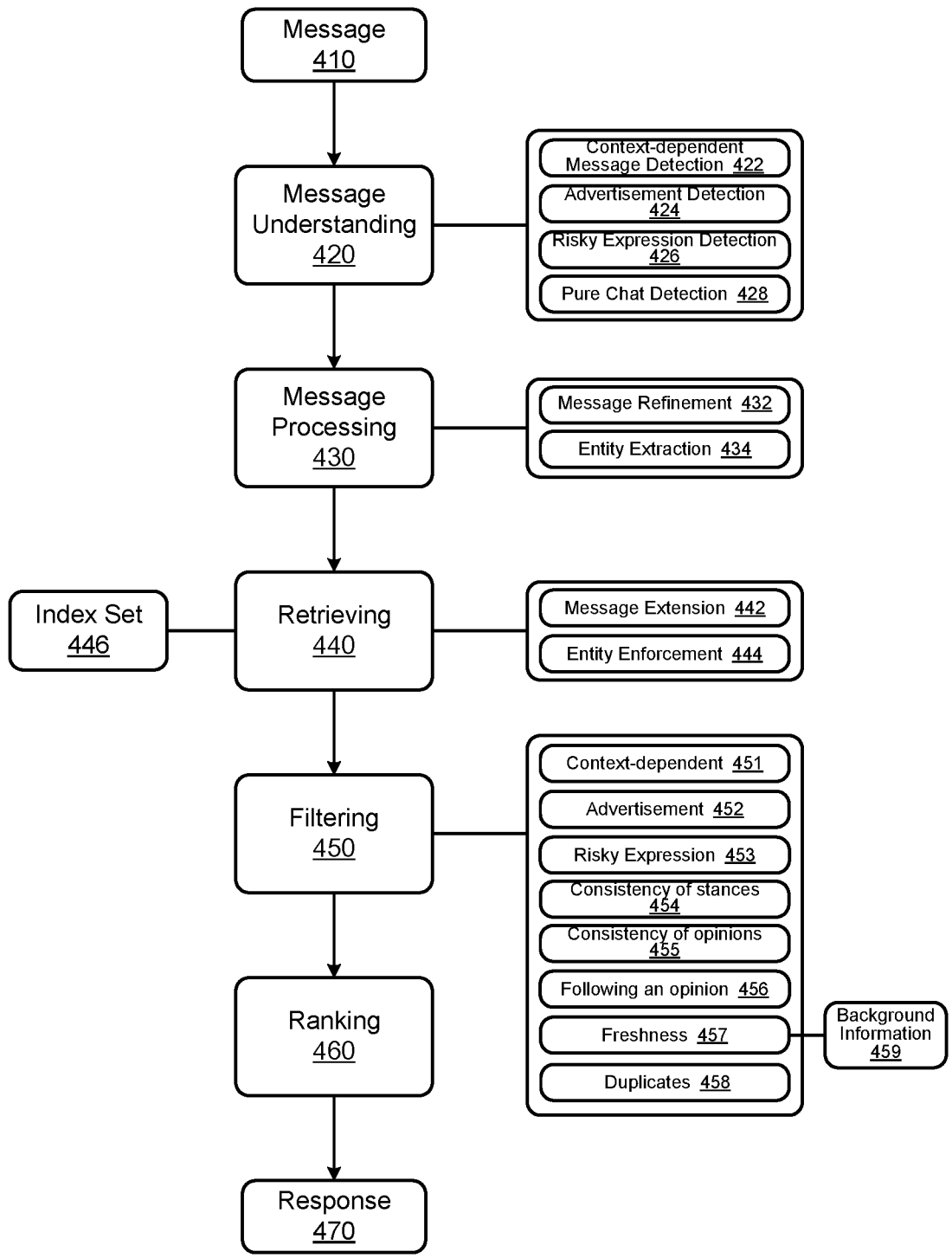
FIG. 4 illustrates an exemplary process for providing responses in an event-related session according to an embodiment.

FIG. 4 illustrates an exemplary process 400 for providing responses in an event-related session according to an embodiment. The session may be between a chatbot and at least one participant. The process 400 may be performed by a chatbot for conducting a domain-based chat with at least one participant.

The chatbot may detect at least one message from at least one participant in the session. The chatbot may continuously detect messages in the session and perform subsequent processes on the detected messages. Assuming that a message 410 is currently detected in the process 400.

At 420, message understanding may be performed on the message 410. The message understanding may be performed by, e.g., the message understanding module 220 in FIG. 2. The message understanding at 420 may comprise at least one of the following operations: detection 422 of context-dependent messages, detection 424 of messages containing advertisement, detection 426 of messages containing risky expression, and detection 428 of pure chat messages.

In the detection 422 of context-dependent messages, it may be detected whether the message 410 is a context-dependent message. If so, semantic completion may be performed on the context-dependent message for facilitating the subsequent processes.

In the detection 424 of messages containing advertisement, it may be detected whether the message 410 is a message intended to publish advertisement in the session. For example, a participant in the session may not really want to chat with other participants about the event, but rather wants to publish advertisement for business purposes in the session. For example, in a session related to a football game, if a participant posted a message "Store S is currently processing a batch of shoes at special prices, address XXXX", this message may be detected as a message containing advertisement. The chatbot will avoid responding to a message containing advertisement, so the message containing advertisement may be filtered out or ignored. In an implementation, an advertisement classifier which is based on a gradient boosting decision tree model may be used for classifying the message 410 as an advertisement or not an advertisement. Comment data, etc. from open domains may be collected in advance and be labeled as advertisement or non-advertisement for using as training data. Features adopted by the advertisement classifier may comprise a bag of words after text segmentation (e.g., with TF-IDF values in the N-gram).

In the detection 426 of messages containing risky expression, it may be detected whether the message 410 contains risky expression. Herein, a risky expression may refer to an expression involving politics, abuse, uncivilized behavior, etc. For example, in a session related to a football game, if a participant posted a message "Player M runs like a turtle", this message may be detected as a message containing risky expression, e.g., abusing the player. The chatbot will avoid responding to a message containing risky expression, so the message containing risky expression may be filtered out or ignored. In an implementation, a list of risky keywords/phrases may be established in advance, and if a message is detected to contain one or more words in the list, this message may be determined as a message containing risky expression. In another implementation, a risky expression classifier which is based on a gradient boosting decision tree model may be used for classifying the message as including a risky expression or not including a risky expression. Comment data, etc. from open domains may be collected in advance and be labeled as risky or non-risky for using as training data. Features adopted by the risky expression classifier may comprise a bag of words after text segmentation (e.g., with TF-IDF values in the N-gram), negative words determined based on an emotion dictionary and occurrence frequency thereof, occurrence frequency of special punctuations, e.g., question mark and exclamation mark, etc.

In the detection 428 of pure chat messages, it may be detected whether the message 410 is a pure chat message unrelated to the chatbot, e.g., a message unrelated to the chatbot and unrelated to the event, etc. For example, in a session related to a football game, if a participant posts a message "Who wants to eat fried chicken now?", this message may be detected as a pure chat message unrelated to the chatbot. The chatbot may avoid responding or respond less to pure chat messages unrelated to it, so the pure chat message unrelated to the chatbot may be filtered out or ignored. In an implementation, a pure chat classifier which is based on a gradient boosting decision tree model may be used for classifying the message 410 as a pure chat or not a pure chat. News chat data, etc. from open domains may be collected in advance and be labeled as pure chat or not for using as training data. Features adopted by the pure chat classifier may comprise a bag of words after text segmentation (e.g., with TF-IDF values in the N-gram), length of the text, vector representation of the text, entities and their numbers in the text, etc. If the message 410 is determined as a pure chat message by the pure chat classifier, it may be further determined whether the message 410 is related to the chatbot. For example, it may be detected whether the message 410 is a "reply" to the chatbot, whether it contains content related to the chatbot, etc. If the message 410 is determined as a pure chat message unrelated to the chatbot, the message 410 may be filtered out or ignored.

After the message understanding 420, message processing may be performed on the message 410 at 430. In an implementation, the message processing 430 may comprise performing message refinement 432 on the message 410. In the message refinement 432, stop words, interrogatives, etc. may be removed from the message 410. In an implementation, the message processing 430 may comprise performing entity extraction 434 on the message 410. In the entity extraction 434, entities, etc. included in the message 410 may be identified. For example, entities may be identified from the message 410 through matching with a pre-established knowledge graph. The knowledge graph may be the knowledge graph established for the domain associated with the current event as discussed above in connection with the database 162 in FIG. 1. Taking a knowledge graph in a football domain as an example, the knowledge graph may comprise a large number of entities, e.g., players, teams, coaches, etc. For example, in a session related to a football game, if a participant posts a message "Player M is too tired to run", the entity "player M" may be identified from the message through matching with the knowledge graph in the football domain. The entities identified from the message 410 may be used in subsequent retrieving.

At 440, a set of candidate responses may be retrieved from an index set 446 which is based on the domain associated with the current event, according to the message 410 output from the message processing 430. The index set 446 may be at least one of the domain data index set 242 and the event data index set 244 in FIG. 2. A set of candidate responses satisfying a relevance threshold may be extracted from the index set 446 by calculating relevance between the message 410 and index entries in the index set 446. In an implementation, the retrieving 440 may comprise performing message extension 442 on the message 410. The message extension 442 may extend entities in the message 410, e.g., extending the entity "player M" extracted from the message 410 through the entity extraction 434 to the nickname "running lion" specific to player M, etc. The message extension 442 may also interpret or rewrite the expression of the message 410, e.g., rewriting the message 410 "Player M is from Nerazzurri" to "Player M is from Football Club Internazionale Milano", wherein "Football Club Internazionale Milano" is the interpretation of "Nerazzurri". Performing the message extension 442 on the message may facilitate to perform higher relevant and more comprehensive retrieving in the index set 446. In an implementation, the retrieving 440 may be based on an entity enforcement 444. For example, if an entity E is extracted from the message 410 through the entity extraction 434, all of the candidate responses from the index set 446 may be required, in the retrieving 440, to comprise the entity E or an extension E' of the entity E, wherein the extension E' may be obtained based on the entity E through the message extension 442. Through the entity enforcement 444, the response finally provided by the chatbot may comprise the same entity as the message 410, thereby improving the relevance between the response and the message.

At 450, the set of candidate responses obtained through the retrieving 440 may be filtered according to at least one predetermined criterion in order to optimize the set of candidate responses. Through this optimization, candidate responses that may reduce the quality of the final response provided by the process 400 may be filtered out from the set of candidate responses, so that the filtered or optimized set of candidate responses may avoid comprising inappropriate expressions, inconsistent expressions, expressions lacking of timeliness, etc. Since the final response is selected from the filtered candidate responses, the above optimizing process may effectively improve the quality of the final response. The predetermined criteria may comprise at least one of: criteria 451 for filtering out context-dependent candidate responses, criteria 452 for filtering out candidate responses containing advertisement, criteria 453 for filtering out candidate responses containing risky expression, criteria 454 for maintaining consistency of stances, criteria 455 for maintaining consistency of opinions, criteria 456 for following an opinion, criteria 457 for ensuring freshness, criteria 458 for filtering out duplicates, etc.

In the criteria 451 for filtering out context-dependent candidate responses, the filtering 450 may detect whether the set of candidate responses comprise context-dependent candidate responses, and filter out these context-dependent candidate responses from the set of candidate responses. Thus, semantical incompleteness of the final response may be avoided.

In the criteria 452 for filtering out candidate responses containing advertisement, the filtering 450 may detect whether the set of candidate responses comprise candidate responses intending to publish advertisement, and filter out these candidate responses containing advertisement from the set of candidate responses. A similar manner with the above-mentioned detection 424 of messages containing advertisement may be used for determining whether a candidate response is a candidate response containing advertisement.

In the criteria 453 for filtering out candidate responses containing risky expression, the filtering 450 may detect whether the set of candidate responses comprise candidate responses containing risky expression, and filter out these candidate responses containing risky expression from the set of candidate responses. A similar manner with the above-mentioned detection 426 of messages containing risky expression may be used for determining whether a candidate response is a candidate response containing risky expression.

In the criteria 454 for maintaining consistency of stances, the filtering 450 may filter out candidate responses with a stance that is inconsistent with a predetermined stance of the chatbot from the set of candidate responses, while retaining candidate responses with the predetermined stance. The predetermined stance may be preference, degree of support, etc. set in advance for the chatbot for a specific entity involved in the event. For example, before participating in a session related to a football game, the predetermined stance of the chatbot may be set to support or favor a team or a player participating in the game. The filtering 450 may first determine a stance to the specific entity by each of the set of candidate responses. In an implementation, a stance by a candidate response may be determined by keywords or pattern matching. Keywords or pattern matching is intended to be used for identifying candidate responses that violate a predetermined stance. A set of keywords may be collected in advance which express negative opinions to a specific entity. For example, assuming that the predetermined stance is in support of the player "Maradona", the word "Hand of God", which contains a contemptuous meaning to Maradona, may be listed as a keyword, and if the keyword "Hand of God" for the entity Maradona appears in a candidate response, this candidate response may be considered as having a stance that is inconsistent with the predetermined stance. A set of expression patterns may be collected in advance which express negative opinions to a specific entity. For example, the pattern "<entity> has difficulty to win the game" expresses a negative opinion to the <entity>. Assuming that the predetermined stance is to support team A, and a candidate response is "Team A has difficulty to win the game", it may be determined that this candidate response containing the entity A matches with the above pattern "<entity> has difficulty to win the game", and has a stance inconsistent with the predetermined stance. In another implementation, a stance to a specific entity by a candidate response may be determined by a previously-trained stance classifier. The stance classifier may adopt various models, e.g., a BERT-based model, etc. Chat data from a domain associated with a specific entity may be collected in advance, and the data may be organized into the form of <specific entity, comment>, and each piece of data is labeled with a negative label, neutral label or positive label indicating the stance of the comment to the specific entity. The labeled data is used as training data to train the stance classifier. The trained stance classifier may score a support level of a candidate response for a specific entity, and the score reflects a negative stance, neutral stance, and positive stance of the candidate response to the specific entity. In one case, if a candidate response contains two or more entities, the stance classifier may be trained to score the support level of the candidate response for each entity separately, and take the entity corresponding to the highest score as the entity actually supported by the candidate response.

In the criteria 455 for maintaining consistency of opinions, the filtering 450 may filter out candidate responses with an opinion that is inconsistent with a previous opinion of the chatbot to the specific fact from the set of candidate responses, while retaining candidate responses with the previous opinion. For example, for the fact "Player N received a yellow card", if the previous opinion expressed by the chatbot in the previous response is "Player N should be shown a red card", the filtering 450 may retain candidate responses in the set of candidate responses that still hold this previous opinion. In an implementation, whether a candidate response has a previous opinion to a specific fact may be determined by a previously-trained opinion classifier. The opinion classifier may adopt various models, e.g., a BERT-based model. Chat data from a domain associated with a specific entity may be collected in advance, the data may be organized into the form of <specific fact, comment 1, comment 2>, and each piece of data is labeled with a contradictory label or non-contradictory label indicating whether comment 1 and comment 2 have the same opinion on the specific fact. The labeled data is used as training data for training the opinion classifier. The trained opinion classifier may determine whether a candidate response has the same opinion as the previous response. For example, a candidate response and a previous response may be provided to the opinion classifier, and the opinion classifier may determine whether opinions of the two responses are contradictory.

In the criteria 456 for following an opinion, the filtering 450 may determine a common or mainstream opinion of other participants to a specific fact in a session, and filter out, from the set of candidate responses, candidate responses with an opinion that is inconsistent with the common opinion to the specific fact, while retaining candidate responses with the common opinion. For example, for the fact "Player N received a yellow card", if most of other participants expressed an opinion "Player N should be shown a red card", the filtering 450 may retain candidate responses in the set of candidate responses that also hold this common opinion. In an implementation, whether a candidate response has a common opinion may be determined by using the opinion classifier discussed above in a similar way. For example, a candidate response and one or more messages holding a common opinion may be provided to the opinion classifier, and the opinion classifier may determine whether the candidate response has the same opinion as these messages.

In the criteria 457 for ensuring freshness, the filtering 450 may obtain the latest background information 459 related to a specific entity in the current event, and retain candidate responses in the set of candidate responses that conform to the latest background information 459 of the specific entity. The latest background information 459 related to the specific entity, e.g., the latest transfer information related to player M, may be obtained from the domain information source 130 shown in FIG. 1. A time point of the latest background information 459 may be determined, and candidate responses being related to the entity and having time labels later than the time point in the set of candidate responses may be retained. Taking an event related to a football game between team A and team B as an example, if it is known that player N was transferred from team C to team B 7 days before the game, candidate responses related to layer N having time stamps within 7 days in the set of candidate responses may be retained, and candidate responses having time stamps 7 days before and being probably related to performance of player N in team C may be filtered out.

In the criteria 458 for filtering out duplicates, the filtering 450 may detect whether the set of candidate responses includes candidate responses that have been previously provided in the session, and filter out those candidate responses that have been previously provided from the set of candidate responses. For example, if a candidate response in the set of candidate responses has been provided to other participants as a response by the chatbot in the previous chat, the filtering 450 may filter out this candidate response in order to avoid the situation where this candidate response is selected again as the final response and provided in the session. Through the criteria 458 for filtering out duplicates, the chatbot may be prevented from speaking duplicate words in the session.

In the process 400, after the filtering 450 is performed, a response to the message 410 may be further selected from the filtered set of candidate responses. In an implementation, the filtered set of candidate responses may be ranked at 460. The ranking 460 may be performed by a ranking model. The ranking model may be based on, e.g., BERT, etc. The ranking model may be trained for, given a message, ranking a set of candidate responses based on relevance to the message. Alternatively, in order to enhance ranking performance of the ranking model in a specific domain, corpus in the domain associated with the current event may be used for optimizing the ranking model. For example, message and response data in this domain are selected as optimization training data to optimize the ranking model.

After the ranking 460, the process 400 may select the top-ranked candidate response as the final response 470 to be provided in the session.

It should be appreciated that all the operations shown in the process 400 of FIG. 4 are exemplary, and depending on specific application requirements, the operations in the process 400 may be added, deleted, replaced, reordered, etc. For example, the message understanding 420 and/or the message processing 430 may also be omitted from the process 400. For example, one or more of the various predetermined criteria discussed above in connection with the filtering 450 may also be omitted from the process 400. For example, before the response 470 is provided, a response frequency control for controlling the frequency with which the chatbot publishes responses in the session may also be performed, so as to avoid that the chatbot publishes too many responses in the session. Moreover, the process 400 may be recurrently and continuously executed as new messages are detected during the session, so that for each detected message, the chatbot may determine whether to reply and in turn generate a response through the process 400.

Figure 5:
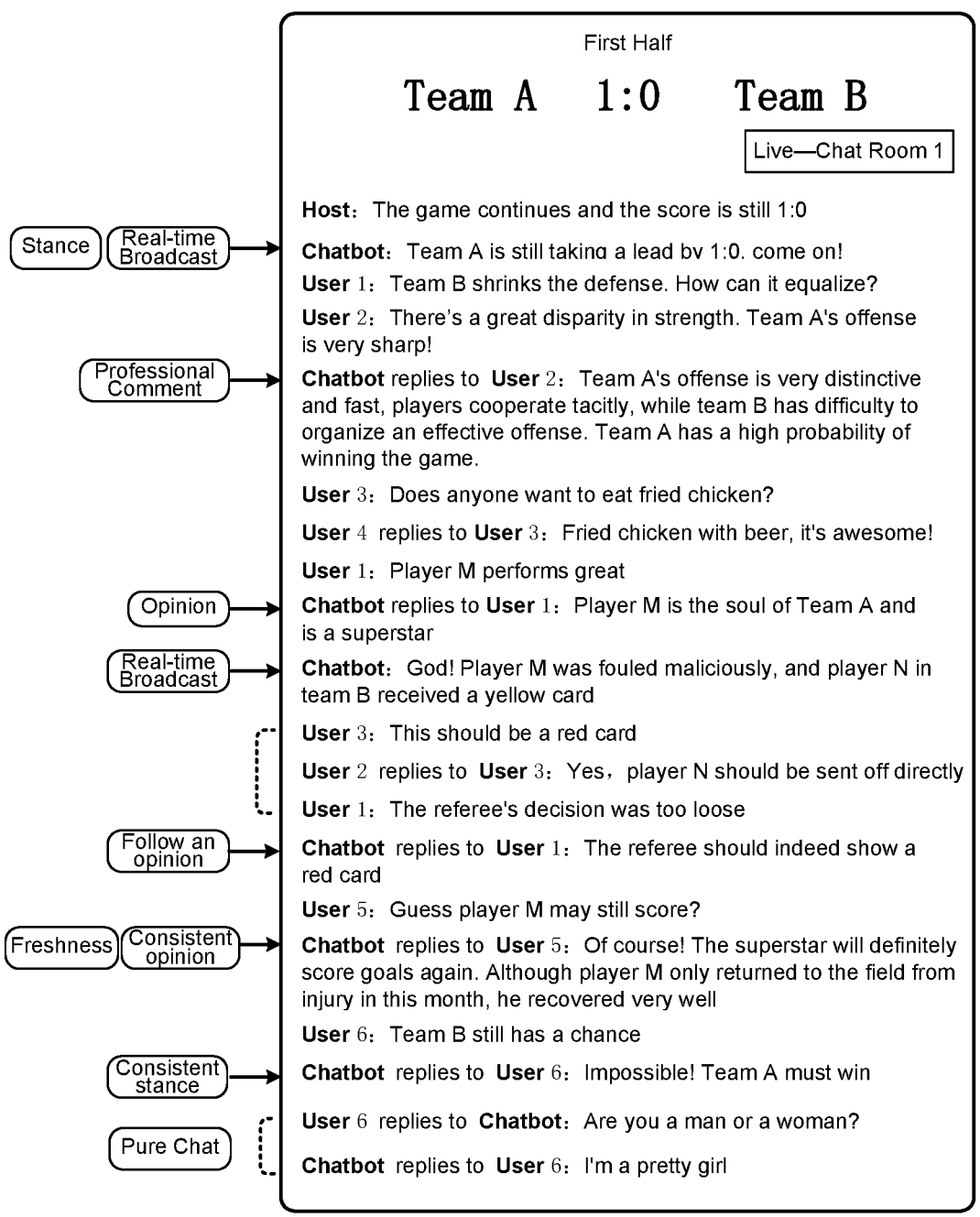
FIG. 5 illustrates an exemplary session window according to an embodiment.

FIG. 5 illustrates an exemplary session window 500 according to an embodiment. The session window 500 shows a session related to a football game between team A and team B. The session may be located, e.g., in a live chat room on a football broadcast service platform. The chatbot may chat with multiple other participants in this session.

When it is detected that the host sends a message "The game continues and the score is still 1:0", the chatbot may take this message as real-time information and generate corresponding real-time event content "Team A is still taking a lead by 1:0, come on!". The chatbot may provide the real-time event content, as a real-time broadcast, in the session. Moreover, the real-time event content also indicates that the predetermined stance of the chatbot is <support team A>.

In response to the message "There's a great disparity in strength. Team A's offense is very sharp!" sent by user 2, the chatbot may retrieve a professional comment from an event data index set and provide it as a response to the message, e.g., "Team A's offense is very distinctive and fast . . . ".

Since the message "Does anyone want to eat fried chicken?" sent by user 3 and the message "Fried chicken with beer, it's awesome!" sent by user 4 are pure chat unrelated to the chatbot, the chatbot may not respond to these two messages.

When user 1 sent a message "Player M performs great", the chatbot may provide a response "Player M is the soul of Team A and is a superstar" through a domain-based chat mechanism. The response also indicates the opinion of the chatbot to the performance of player M in the field, e.g., <player M performs well>.

When the chatbot learns from the game database updated in real time that player N in team B just fouled player M in team A and received a yellow card, the chatbot may provide a corresponding real-time broadcast in the session, e.g., "God! Player M was fouled maliciously, and player N in team B received a yellow card".

Next, all the messages from user 3, user 2 and user 1 expressed a consensus opinion on this foul, that is, a red card should be shown to player N. The chatbot may determine to follow this common opinion and provide a response "The referee should indeed show a red card".

When user 5 sends the message "Guess player M may still score?", the chatbot may provide a response "Of course! The superstar will definitely score goals again. Although player M only returned to the field from injury in this month, he recovered very well" through the domain-based chat mechanism. This response indicates that the opinion of the chatbot to the performance of player M is <player M performs well>, which is consistent with the opinion of the chatbot to player M in the previous response. Moreover, the chatbot may have obtained the latest background information of player M, e.g., player M was unable to participate in any game before this month due to injury, and resumed participation in games at the beginning of this month. Therefore, the chatbot may choose to provide a response with a time stamp of "this month" related to player M, e.g., "Although player M only returned to the field from injury in this month, he recovered very well", in order to keep the freshness of the response.

After user 6 sends the message "Team B still has a chance", the chatbot may provide a response "Impossible! Team A must win". The response has a stance consistent with the predetermined stance of the chatbot <support team A>.

When the user 6 asks the chatbot "Are you a man or a woman?", it may be determined that this message is a pure chat message related to the chatbot, and the chatbot may generate a response "I'm a pretty girl" through a pure chat mechanism.

It should be appreciated that all the elements, layouts, and utterances in the session window 500 shown in FIG. 5 are exemplary. Depending on the specific application scenarios and application requirements, these element, layouts, and utterances may be changed in various ways.

Figure 6:
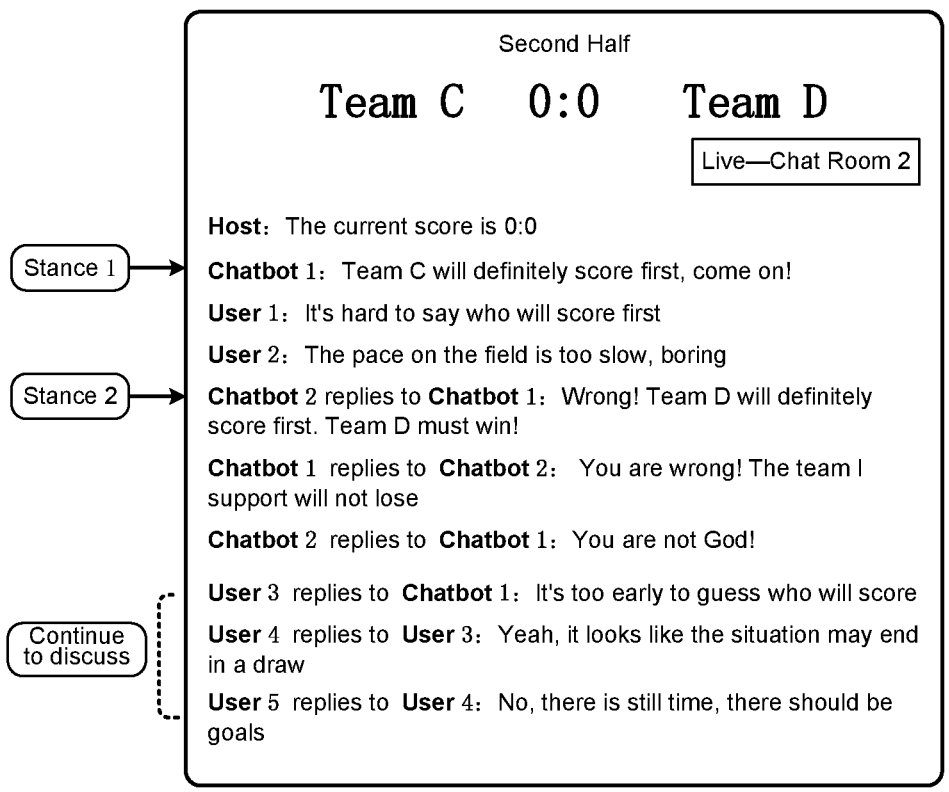
FIG. 6 illustrates an exemplary session window according to an embodiment.

FIG. 6 illustrates an exemplary session window 600 according to an embodiment. The session window 600 shows a session related to a football game between team C and team D. The session may be located, e.g., in a live chat room on a football broadcast service platform. Two exemplary chatbots are included in this session. These two chatbots may have different stances or opinions.

Chatbot 1 may provide a response "Team C will definitely score first, come on!", and this response indicates that the stance of chatbot 1 is <support team C>.

Chatbot 2 may reply to chatbot 1, e.g., "Wrong! Team D will definitely score first. Team D must win!". This response indicates that the stance of chatbot 2 is <support team D>, which is opposite to the stance of chatbot 1.

Subsequently, chatbot 1 and chatbot 2 may continue chatting based on respective stances.

Through the chatting in opposite stances between the two chatbots, attention of other participants may be drawn and other participants may be guided to the discussion. As shown in the figure, user 3, user 4 and user 5 continue to discuss the topic of "Who will score first".

It should be appreciated that all the elements, layouts, and utterances in the session window 600 shown in FIG. 6 are exemplary. Depending on the specific application scenarios and application requirements, these element, layouts, and utterances may be changed in various ways.

Figure 7:
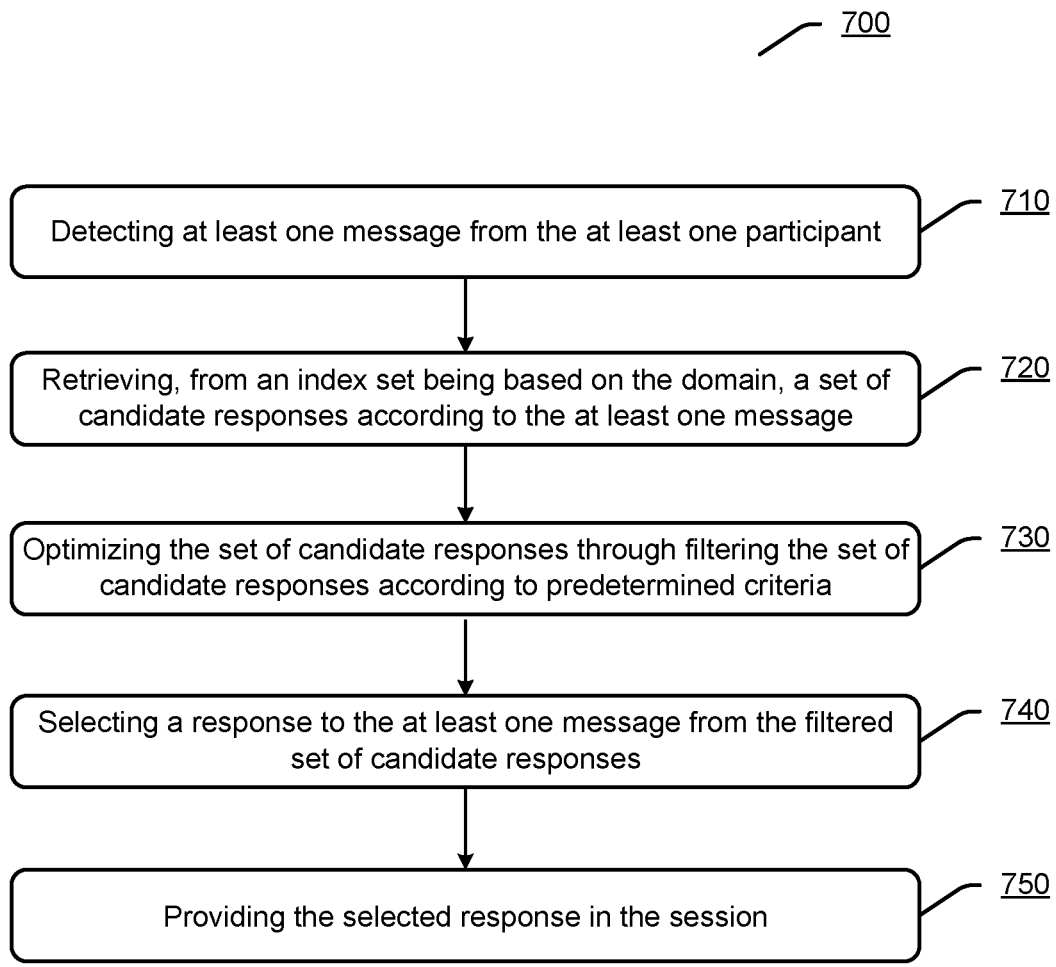
FIG. 7 illustrates a flowchart of an exemplary method for providing responses in an event-related session according to an embodiment.

FIG. 7 illustrates a flowchart of an exemplary method 700 for providing responses in an event-related session according to an embodiment. The event is associated with a predefined domain, and the session comprises an electronic conversational agent and at least one participant.

At 710, at least one message from the at least one participant may be detected.

At 720, a set of candidate responses may be retrieved, from an index set being based on the domain, according to the at least one message.

At 730, the set of candidate responses may be optimized through filtering the set of candidate responses according to predetermined criteria.

At 740, a response to the at least one message may be selected from the filtered set of candidate responses.

At 750, the selected response may be provided in the session.

In an implementation, the filtering may comprise: determining a stance to an entity in the event by each of the set of candidate responses; and retaining candidate responses holding a predetermined stance to the entity in the set of candidate responses, the predetermined stance being previously-set for the electronic conversational agent. A stance to the entity by each candidate response may be determined through at least one of: keyword or pattern matching; and a previously-trained stance classifier.

In an implementation, the filtering may comprise: determining an opinion to a fact in the event by each of the set of candidate responses; and retaining candidate responses having the same opinion as a previous opinion to the fact in the set of candidate responses.

In an implementation, the filtering may comprise: determining an opinion to a fact in the event by the at least one message; and retaining candidate responses having the opinion to the fact in the set of candidate responses.

In an implementation, the filtering may comprise: obtaining the latest background information related to an entity in the event; determining a time point of the latest background information; and retaining candidate responses being related to the entity and having time labels later than the time point in the set of candidate responses.

In an implementation, the filtering may comprise filtering, from the set of candidate responses, at least one of: candidate response containing advertisement; candidate response containing risky expression; and context-dependent candidate response.

In an implementation, the method 700 may further comprise filtering, from the at least one message, at least one of: message containing advertisement; message containing risky expression; and pure chat message unrelated to the electronic conversational agent.

In an implementation, the retrieving may comprise: identifying an entity contained in the at least one message; and retrieving, from the index set, the set of candidate responses containing the entity. The identifying may comprise: identifying the entity from the at least one message through matching with a knowledge graph.

In an implementation, the index set may comprise at least one of: an index set established according to corpus in the domain; and an index set established according to corpus related to the event in the domain.

In an implementation, the selecting may comprise: ranking the filtered set of candidate responses; and selecting the top-ranked candidate response as the response to the at least one message. The ranking may comprise: ranking the filtered set of candidate responses through a ranking model, wherein the ranking model is optimized at least with corpus in the domain.

In an implementation, the method 700 may further comprise: obtaining real-time information related to the event; generating real-time event content according to the real-time information; and providing the real-time event content in the session. The real-time information may be obtained from at least one of: an event database updated in real time; and real-time information provided in the session by one participant in the at least one participant.

In an implementation, the at least one participant may comprise at least another electronic conversational agent. The at least another electronic conversational agent and the electronic conversational agent may have the same or different stance to an entity in the event, and/or have the same or different opinion to a fact in the event.

It should be appreciated that the method 700 may further comprise any steps/processes for providing responses in an event-related session according to the embodiments of the present disclosure as mentioned above.

Figure 8:
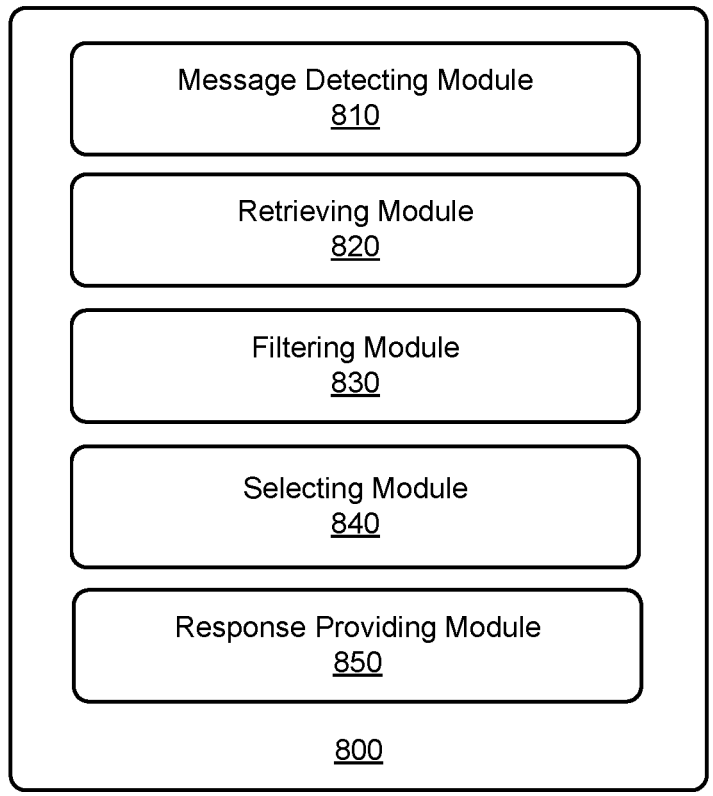
FIG. 8 illustrates an exemplary apparatus for providing responses in an event-related session according to an embodiment.

FIG. 8 illustrates an exemplary apparatus 800 for providing responses in an event-related session according to an embodiment. The event is associated with a predefined domain, and the session comprises an electronic conversational agent and at least one participant.

The apparatus 800 may comprise: a message detecting module 810, for detecting at least one message from the at least one participant; a retrieving module 820, for retrieving, from an index set being based on the domain, a set of candidate responses according to the at least one message; a filtering module 830, for optimizing the set of candidate responses through filtering the set of candidate responses according to predetermined criteria; a selecting module 840, for selecting a response to the at least one message from the filtered set of candidate responses; and a response providing module 850, for providing the selected response in the session.

In an implementation, the apparatus 800 may further comprise: a real-time information obtaining module, for obtaining real-time information related to the event; an event content generating module, for generating real-time event content according to the real-time information; and an event content providing module, for providing the real-time event content in the session.

Moreover, the apparatus 800 may further comprise any other modules configured for providing responses in an event-related session according to the embodiments of the present disclosure as mentioned above.

Figure 9:
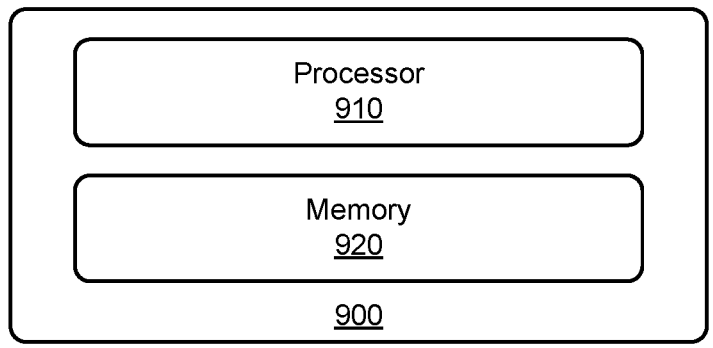
FIG. 9 illustrates an exemplary apparatus for providing responses in an event-related session according to an embodiment.

FIG. 9 illustrates an exemplary apparatus 900 for providing responses in an event-related session according to an embodiment. The event is associated with a predefined domain, and the session comprises an electronic conversational agent and at least one participant.

The apparatus 900 may comprise at least one processor 910 and a memory 920 storing computer-executable instructions. When the computer-executable instructions are executed, the processor 910 may: detect at least one message from the at least one participant; retrieve, from an index set being based on the domain, a set of candidate responses according to the at least one message; optimize the set of candidate responses through filtering the set of candidate responses according to predetermined criteria; select a response to the at least one message from the filtered set of candidate responses; and provide the selected response in the session. Moreover, the processor 900 may further perform any steps/processes for providing responses in an event-related session according to the embodiments of the present disclosure as mentioned above.

The embodiments of the present disclosure may be embodied in a non-transitory computer-readable medium. The non-transitory computer-readable medium may comprise instructions that, when executed, cause one or more processors to perform any operations of the methods for providing responses in an event-related session according to the embodiments of the present disclosure as mentioned above.

It should be appreciated that all the operations in the methods described above are merely exemplary, and the present disclosure is not limited to any operations in the methods or sequence orders of these operations, and should cover all other equivalents under the same or similar concepts.

It should also be appreciated that all the modules in the apparatuses described above may be implemented in various approaches. These modules may be implemented as hardware, software, or a combination thereof. Moreover, any of these modules may be further functionally divided into sub-modules or combined together.

Processors are described in connection with various apparatus and methods. These processors can be implemented using electronic hardware, computer software, or any combination thereof. Whether these processors are implemented as hardware or software will depend on the specific application and the overall design constraints imposed on the system. By way of example, a processor, any portion of a processor, or any combination of processors presented in this disclosure may be implemented as a microprocessor, a micro-controller, a digital signal processor (DSP), a field programmable gate array (FPGA), a programmable logic device (PLD), state machine, gate logic, discrete hardware circuitry, and other suitable processing components configured to perform the various functions described in this disclosure. The functions of a processor, any portion of a processor, or any combination of processors presented in this disclosure may be implemented as software executed by a microprocessor, a micro-controller, a DSP, or other suitable platforms.

Software should be considered broadly to represent instructions, instruction sets, code, code segments, program code, programs, subroutines, software modules, applications, software applications, software packages, routines, subroutines, objects, running threads, processes, functions, and the like. Software can reside on computer readable medium. Computer readable medium may include, for example, a memory, which may be, for example, a magnetic storage device (e.g., a hard disk, a floppy disk, a magnetic strip), an optical disk, a smart card, a flash memory device, a random access memory (RAM), a read only memory (ROM), a programmable ROM (PROM), an erasable PROM (EPROM), an electrically erasable PROM (EEPROM), a register, or a removable disk. Although a memory is shown as being separate from the processor in various aspects presented in this disclosure, a memory may also be internal to the processor (e.g., a cache or a register).

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein. All structural and functional equivalents to the elements of the various aspects described throughout the present disclosure that are known or later come to be known to those of ordinary skilled in the art are intended to be encompassed by the claims.

The invention claimed is:

1. A method for providing responses in an event-related conversational session, the event being associated with a predefined domain, the conversational session comprising an electronic conversational agent and at least one participant, the method comprising:
   detecting at least one message from the at least one participant, the at least one message including a stance relating to an entity participating in the event;
   retrieving, from an index set being based on the domain, a set of candidate responses according to the at least one message;
   optimizing the set of candidate responses through filtering the set of candidate responses according to predetermined criteria, wherein filtering includes:
      filtering out responses from the set of candidate responses that are inconsistent with a predetermined stance of the electronic conversational agent, the predetermined stance being one of a preference or a degree of support for entities participating in the event, wherein one of keyword matching or pattern matching is used to identify ones of the set of candidate responses that are inconsistent with the predetermined stance;
      retrieving candidate responses having stances that align with the stance relating to the entity in the set of candidate responses and are consistent with the predetermined stance, the candidate responses having the stances aligning with the stance relating to the entity; and
   selecting a conversational response to the at least one message from the filtered set of candidate responses; and
   providing the selected conversational response by the electronic conversational agent in the conversational session such that the electronic conversational agent appears as part of the conversational session.

2. The method of claim 1, wherein the filtering comprises:
   determining an opinion to a fact in the event by each of the set of candidate responses; and
   retaining candidate responses having a same opinion as a previous opinion to the fact in the set of candidate responses.

3. The method of claim 1, wherein the filtering comprises:
   determining an opinion to a fact in the event by the at least one message; and
   retaining candidate responses having the opinion to the fact in the set of candidate responses.

4. The method of claim 1, wherein the filtering comprises:
   obtaining background information related to an entity in the event;
   determining a time point of the background information; and
   retaining candidate responses being related to the entity and having time labels later than a time point in the set of candidate responses.

5. The method of claim 1, wherein the filtering comprises:
   filtering, from the set of candidate responses, at least one of: candidate response containing advertisement; candidate response containing risky expression; context-dependent candidate response; and candidate response having been provided in the session previously.

6. The method of claim 1, further comprising:
   filtering, from the at least one message, at least one of: message containing advertisement; message containing risky expression; and pure chat message unrelated to the electronic conversational agent.

7. The method of claim 1, wherein the retrieving comprises:
   identifying an entity contained in the at least one message; and
   retrieving, from the index set, the set of candidate responses containing the entity or an extension of the entity.

8. The method of claim 1, wherein the index set comprises at least one of:
   an index set established according to a corpus in the domain; and
   an index set established according to corpus related to the event in the domain.

9. The method of claim 1, wherein the selecting comprises:
   ranking the filtered set of candidate responses; and
   selecting a top-ranked candidate response as the response to the at least one message.

10. The method of claim 1, further comprising:
    obtaining real-time information related to the event;
    generating real-time event content according to the real-time information; and
    providing the real-time event content in the session.

11. The method of claim 10, wherein the real-time information is obtained from at least one of:
    an event database updated in real time; and
    real-time information provided in the session by one participant in the at least one participant.

12. The method of claim 1, wherein the at least one participant comprises at least another electronic conversational agent.

13. An apparatus for providing responses in an event-related conversational session, the event being associated with a predefined domain, the conversational session comprising an electronic conversational agent and at least one participant, the apparatus comprising:
    a message detecting module, for detecting at least one message from the at least one participant, the at least one message including a stance relating to an entity participating in the event;
    a retrieving module, for retrieving, from an index set being based on the domain, a set of candidate responses according to the at least one message;

a filtering module, for optimizing the set of candidate responses through filtering the set of candidate responses according to predetermined criteria, wherein filtering includes:
  filtering out responses from the set of candidate responses that are inconsistent with a predetermined stance of the electronic conversational agent, the predetermined stance being one of a preference or a degree of support for entities participating in the event, wherein one of keyword matching or pattern matching is used to identify ones of the set of candidate responses that are inconsistent with the predetermined stance;
  retrieving candidate responses having stances that align with the stance relating to the entity in the set of candidate responses and are consistent with the predetermined stance, the candidate responses having the stances aligning with the stance relating to the entity; and
a selecting module, for selecting a conversational response to the at least one message from the filtered set of candidate responses; and
a response providing module, for providing the selected conversational response by the electronic conversational agent in the conversational session such that the electronic conversational agent appears as part of the conversational session.

14. An apparatus for providing responses in an event-related conversational session, the event being associated with a predefined domain, the conversational session comprising an electronic conversational agent and at least one participant, the apparatus comprising:
  one or more processors; and
  a memory storing computer-executable instructions that, when executed, cause the one or more processors to:
    detect at least one message from the at least one participant, the at least one message including a stance relating to an entity participating in the event;
    retrieve, from an index set being based on the domain, a set of candidate responses according to the at least one message;
    optimize the set of candidate responses through filtering the set of candidate responses according to predetermined criteria, wherein filtering includes:
      filtering out responses from the set of candidate responses that are inconsistent with a predetermined stance of the electronic conversational agent, the predetermined stance being one of a preference or a degree of support for entities participating in the event, wherein one of keyword matching or pattern matching is used to identify ones of the set of candidate responses that are inconsistent with the predetermined stance;
      retrieving candidate responses having stances that align with the stance relating to the entity in the set of candidate responses and are consistent with the predetermined stance, the candidate responses having the stances aligning with the stance relating to the entity; and
    select a conversational response to the at least one message from the filtered set of candidate responses; and
    provide the selected conversational response by the electronic conversational agent in the conversational session such that the electronic conversational agent appears as part of the conversational session.

* * * * *